(12) United States Patent
Delouvee et al.

(10) Patent No.: US 6,305,424 B1
(45) Date of Patent: Oct. 23, 2001

(54) SYSTEM FOR SUPPORTING PIPES IN SERVICE GALLERIES, ESPECIALLY IN THE NUCLEAR INDUSTRY

(75) Inventors: Bernard Delouvee, La Garenne-Colombes; Philippe Potard, Villepreux, both of (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/152,881

(22) Filed: Sep. 14, 1998

(30) Foreign Application Priority Data

Sep. 18, 1997 (FR) .................................................. 97 11629

(51) Int. Cl.⁷ ...................................................... F16L 3/10
(52) U.S. Cl. ........................ 138/107; 138/106; 248/67.7; 248/68.1; 248/74.1; 248/74.4
(58) Field of Search ..................... 138/107, 106, 138/103; 248/68.1, 67.7, 73, 74.1, 74.4

(56) References Cited

U.S. PATENT DOCUMENTS

| | | | |
|---|---|---|---|
| 1,220,343 | * 3/1917 | Kimball | 138/106 |
| 2,215,283 | * 9/1940 | Adler | 138/107 |
| 2,352,145 | * 6/1944 | Wright | 138/107 |
| 2,655,088 | 10/1953 | Charley | 97/198.1 |
| 2,894,773 | 7/1959 | Noe | 287/54 |
| 2,906,294 | * 9/1959 | Peterson | 138/106 |
| 3,370,815 | * 2/1968 | Opperthauser | 138/107 |
| 3,375,856 | * 4/1968 | Howard et al. | 138/106 |
| 3,761,600 | * 9/1973 | Perry | 138/115 |
| 3,787,016 | 1/1974 | Laval, Jr. . | |
| 3,924,676 | * 12/1975 | Bennett | 138/106 |
| 4,032,246 | 6/1977 | Waara | 403/390 |
| 4,090,686 | * 5/1978 | Yarbrough | 138/106 |
| 4,115,966 | 9/1978 | DeLee | 52/148 |
| 4,126,012 | * 11/1978 | Waller | 138/106 |
| 4,146,203 | * 3/1979 | Williams | 138/107 |
| 4,391,426 | * 7/1983 | Göthberg | 138/115 |
| 4,516,296 | 5/1985 | Sherman | 24/279 |
| 4,530,478 | * 7/1985 | McClellan | 138/106 |
| 4,718,459 | * 1/1988 | Adorjan | 138/106 |
| 4,960,253 | * 10/1990 | Perrault et al. | 248/68.1 |
| 5,039,039 | 8/1991 | Schaffer . | |
| 5,052,474 | * 10/1991 | Bronnert | 248/68.1 |
| 5,102,073 | * 4/1992 | Lestenkof, Jr. | 138/106 |
| 5,111,770 | 5/1992 | Weelink | 119/27 |
| 5,215,281 | 6/1993 | Sherman | 248/74.1 |
| 5,564,658 | * 10/1996 | Rinderer | 248/68.1 |
| 5,593,115 | * 1/1997 | Lewis | 248/68.1 |
| 5,961,248 | 10/1999 | Tourtellotte | 403/400 |
| 6,227,757 | 5/2001 | Delouvee et al. . | |

FOREIGN PATENT DOCUMENTS

| | | |
|---|---|---|
| 1 091 746 A | 4/1955 | (FR) . |
| 1 125 029 A | 10/1956 | (FR) . |
| 2019664 | 10/1979 | (GB) . |
| 2 120 310 A | 11/1983 | (GB) . |
| 2 241 735 A | 9/1991 | (GB) . |

* cited by examiner

*Primary Examiner*—James Hook
(74) *Attorney, Agent, or Firm*—Wolf, Greenfield & Sacks, P.C.

(57) ABSTRACT

A novel support system is disclosed for supporting pipes conducting fluid in service galleries, particularly in the chemical, petrochemical or nuclear industry. The support system includes at least one pre-assembled, movable portal frame including metal tubes welded together and set out as a main framework and rungs intended to support said pipes having a horizontal or inclined longitudinal axis. After moving the support system to a service gallery, an anchoring structure is used to anchor the pre-assembled, movable portal frame to structural works in the service gallery.

40 Claims, 4 Drawing Sheets

SYSTEM FOR SUPPORTING PIPES IN SERVICE GALLERIES, ESPECIALLY IN THE NUCLEAR INDUSTRY

The subject of the present invention is a system for supporting pipes in service galleries, particularly in the nuclear industry.

A support system, which has an entirely original tubular structure is—generally developed to have a modular design, is advantageously used in service galleries where, in a relatively small volume, there is a high concentration of pipes distributed in horizontal and/or vertical and/or inclined rows. These may, in particular, be service galleries in the chemical, petrochemical, or nuclear industries, and more specifically in the latter context, for example, so-called active service galleries of irradiated nuclear fuel reprocessing workshops. These service galleries form, so to speak, the main artery of the said workshops; the central artery along which all the pipes conveying active fluids (fluids which exhibit radioactivity) connecting equipment installed in the active cells located on each side, and all distributions of utilities (cooling fluids, heating fluids, etc.) pass from the accessible rooms to the equipment located in the live region.

The support system of the invention is particularly well suited to this nuclear context (although it is not restricted thereto) insofar as it can be designed to be earthquake-proof and optimized, on the one hand, in terms of the organization of design work; on the other hand, in savings in the weight of stainless steel; and finally, in terms of worksite organization. In particular, the system can be preassembled, pre-equipped with its pipes and then installed and completed at a later stage. The person skilled in the art will appreciate all the advantages of the said system of the invention (inherent in its intrinsic characteristics and particularly well suited to the context of the nuclear industry) by studying the description which follows and the figures which are appended to the description.

According to the prior art, the said service galleries of the nuclear industry, and particularly of the reprocessing workshops, contain, for supporting the pipes (particularly the earthquake-proof pipes), a metal structure which is complicated, heavy, and one-piece (continuous) once assembled. The prior art structure is actually assembled almost completely in situ by welding and bolting, generally at the centre of the galleries. It is secured to the walls of the galleries by reinforced-concrete beams; the concrete are highly reinforced. The structure, sometimes called a platform or framework, is based on standard sections used in mechanical construction, which have a cross-section, at right-angles to their longitudinal axis, in the shape of a U or H (I).

The structure is in fact used:

initially (during the construction phase) for mounting the pipes; and subsequently (in service) for supporting the said pipes and possibly for supporting miscellaneous small equipment items and for access to the said pipes should intervention be required.

In order to be declared earthquake-proof, such support structures have to support the pipes with a supports spacing shorter than or equal to the maximum authorized supports spacing. This maximum spacing obviously depends on the diameter of the pipe supported and on the fluid conveyed. At the present time, recent stipulations fix this maximum spacing at 1.5 m for small-diameter pipes. Such stipulations are becoming ever more strict. In order to comply with them, the support structures of the prior art, which are already heavy, almost inexorably need to be made considerably heavier still.

With reference to the new stipulations, it has been proposed that the support structures of the prior art be supplemented by additional support structures grafted onto the beams which secure them to the walls of the service gallery. It has also been proposed to supplement the structures of the prior art with horizontal metal bars; such horizontal bars are also advantageously offset and attached to the walls of the service gallery.

In such a context, the Applicant Company has developed a novel design of a support system for pipes in active galleries: this is a modular design with modules based on tubular sections. The modules in question consist of a single portal frame or, advantageously, consist of a combination of a number of portal frames, generally two or three. This is desired in detail later.

The support system of the invention characteristically comprises at least one portal frame made, not of standard sections of the type recalled hereinabove, but of metal tubes. The metal tubes that form the said portal frame are welded together and set out as a main framework and rungs, secured to the said main framework; the (tubular) rungs are intended to support the pipes that have a horizontal or inclined longitudinal axis.

Characteristically, the support system of the invention is a tubular structure. The tubular structure may be anchored to the structural works in numerous alternative ways, generally involving attachment pieces and/or welding. The tubular structure may, in particular, be attached by welding to a metal structure a (framework, fascia or built-in mounting plate) or may itself be fitted with means for anchoring it to the structural works. There are various embodiments of such means which may, in particular, include mounting plates, connecting pieces which spread the load of the support system over the concrete structure of the walls of the active gallery in which the system is located. The mounting plates, secured to the main framework of the system, are suitable for anchoring using fixing studs. For this purpose they comprise positioning marks. The marks are used for drilling, in situ, the diameter of the studs.

It is intended that one, advantageous and original, embodiment of such anchoring means of the mounting-plate type be specified below.

As indicated above, the said mounting plates are secured to the main framework of the portal frame(s) involved in the structure of the support systems of the invention and are appropriate for anchoring using the fixing studs. To this end, they advantageously each comprise at least one series of positioning marks; the distances between centres of the positioning marks of the series are calculated to allow at least one stud definitely to be fitted through one of the positioning marks of the series or at the centre of the series.

When knowing the reinforcement or even the over-reinforcement of the structural works into which the support system of the invention is to be anchored, at least one appropriate series of positioning marks is produced on the anchoring (attachment) plates thereof in such a way that at least one stud can be positioned through one of the marks of the series (at worst, at the centre of the said series), avoiding all of the reinforcing bars in the concrete. Using such mounting plates it is therefore possible to anchor the support system in theoretical reference areas defined during the support studies while at the same time preserving the integrity of the reinforcements in the structural works. To achieve this, soundings are made. If the sounding through a first positioning mark of the series interferes with a reinforcing bar, then another sounding is made through another mark in the series, and so on.

The mounting plates advantageously comprise at least two series, and preferably four series, of such positioning marks; the series are advantageously offset and/or distributed symmetrically at the surface of the mounting plates. Thus, each mounting plate can be anchored at a minimum of two points, and preferably, at four points; such multi-point anchorage is advantageously optimized by the distribution of the points on the surface of the mounting plates.

In a particularly advantageous alternative form, each of the series comprises four positioning marks arranged at the four corners of a square the side of which is longer than the diameter of the reinforcing bars in the structural works and shorter than the distance between two of the reinforcing bars. In the context of this alternative form there are preferably four series of this sort distributed symmetrically at the four corners of a right parallelepipedal mounting plate based on a square, of small thickness.

The means of anchoring the portal frame(s) of the support system of the invention are therefore advantageously of the above type, to make sure that it is definitely possible for the anchorage to be performed in predetermined places, while preserving the integrity of the reinforcement in the places.

Let us return now to the tubular structure of the support system of the invention, more specifically to the base unit of the tubular structure: the portal frame. The portal frame has, as already mentioned, a main framework and rungs.

In a preferred embodiment, the main framework consists of two horizontal tubular sections and of at least one (advantageously two) vertical tubular section(s). It is thus in the form of a frame with three (advantageously four) sides.

The horizontal rungs supplement the structure of the portal frame, exhibiting such a main framework, may be arranged in various ways and, in particular:

in just one series, secured to the two vertical tubular sections of the main framework or, either to the (single) vertical tubular section of the main framework or to another vertical tubular section secured to the main framework (the other tubular section being used to "close" the three-sided frame);

in two adjacent series, secured to the vertical tubular sections of the main framework and to another, intermediate, vertical tubular section (provided between the vertical tubular sections of the main framework) secured to the main framework, or secured to the (single) vertical tubular section of the main framework and to two other vertical tubular sections secured to the main framework (one closing the frame, and the other able to count as an intermediate member);

in more than two adjacent series, secured to the vertical tubular section(s) of the main framework and to additional vertical tubular sections secured to the main framework (in this instance, there will be at least one series in which the rungs are secured only to intermediate additional vertical sections and are therefore no longer secured directly to the main framework).

Advantageously, the rungs of adjacent series are not located at the same level. Different distributions of the rungs within such adjacent series are recommended for reasons of space occupancy of the horizontal and/or inclined rows of pipes that are to be supported via the rungs. It is not precluded for certain rungs of two adjacent series to be located at the same level.

In the context of this embodiment, the two horizontal tubular sections of the main framework advantageously have a free end to which means of anchoring the framework to the structural works are attached. The anchoring means are preferably of the advantageous type specified above (mounting plates with (a) series of positioning marks).

In general, the portal frame that forms the support system of the invention, or at least one of the portal frames involved in the structure of the support system of the invention is advantageously designed, at the bottom, to allow a floor structure, particularly of the metal grating type, to be fitted. It is thus possible to contrive for the bottom horizontal tubular section of the main framework of the embodiment described in detail above to have a free end for this purpose.

The bottom horizontal tubular section thus advantageously has two free ends, one to which the means of anchoring the structure to the structural works are attached and the other on which a floor structure may be placed.

The embodiment of the portal frame of the support system of the invention, as described above, is most particularly appropriate for anchoring the portal frame to a vertical wall. The person skilled in the art will readily understand that it may be anchored to a horizontal wall, of the floor or even ceiling type, it simply being necessary to reconsider the part names given to the main framework and the rungs.

Earlier in this description, mention was made of the modular design of the support system of the invention. This design can be followed through into a number of versions. The base module may consist of a single tubular portal frame as described hereinabove, or of at least two portal frames of this type. Advantageously, in the context of the present invention, at least two portal frames, or even at least three portal frames are combined. Thus, the system of the invention for supporting pipes is advantageously in the form of single-portal, two-portal or three-portal modules (the portals being tubular), the layout of which modules within an active gallery will be optimized. Combining more than three portal frames is not in any way precluded from the scope of the invention, but proves to be an alternative which is not particularly advantageous because this starts to depart from the underlying concept of the invention, which is that of a small, simple and lightweight structure.

The multi-portal modules are obtained by securing independent portal frames together. This securing, which is achieved by welding or by any other means, uses horizontal metal structures which act as stiffeners. The said metal structures or stiffeners are advantageously tubes. Thus, according to an advantageous alternative form of the invention, the support system includes only metal tubes, set out as portal frames or as units of several portal frames. The stiffeners which link several portal frames together effectively stiffen the assembly. Furthermore, they are suitable for supporting vertical rows of pipes.

The length of the stiffeners is obviously adapted to suit the desired spacing between two portal frames. The spacing, with reference to the earthquake-proof standards, must be shorter than or equal to a maximum value. In general, use is made of stiffeners whose length corresponds to the maximum value. However, there is nothing to prevent the use of shorter stiffeners in sensitive regions and longer stiffeners in regions which are far less sensitive. The length of the stiffeners sets the supports spacing for a pipe within a support system of the invention comprising several portal frames (the supports spacing is equal to the spacing between two adjacent portal frames).

In a region where only single-portal support systems are being used, the supports spacing corresponds to the spacing between the portal frames.

The person skilled in the art will have already appreciated the full benefit of the support system of the invention which, based on metal tubes, is optimized in terms of weight, earthquake resistance, thermal expansion, inertia, etc. Furthermore, the fact that the system is broken down into modules which contain a number of portal frames, offers attractive possibilities. The system can thus be pre-assembled and pre-equipped with pipes. In point of fact, systems comprising 2, 3 or even 4 portal frames can be brought onto site pre-equipped with pipes; wherein the pipes are advantageously set out in horizontal and/or inclined and/or vertical rows.

These concepts of pre-assembly and pre-equipping are very important given the nature and size of the sites on which the pipe support systems generally need to be installed.

It has already been understood here that the invention completely overturns the conventional ideas for supporting pipes in active galleries by proposing simple lightweight independent tubular structures (generally with 1, 2 or 3 portal frames), possibly pre-assembled or even pre-equipped with pipes in place of complicated heavy one-piece structures which of necessity have to be almost completely assembled in situ.

The context of the present invention also includes proposing advantageous means of connecting the supported pipes to the original support system of the invention; the pipes (horizontal and/or inclined and/or vertical, taken individually or in rows) are obviously not simply placed in contact with the support tubes but are secured to these. Securing means of various types (of various levels of sophistication depending on the tightness of the specification to be met) and known to those skilled in the art may be involved. Securing means or connecting means of the type defined hereafter are, according to the invention, quite specifically recommended. Such (earthquake-proof) means have already been developed by the Applicant Company and are the subject of a parallel patent application. Thus, the original support system of the invention is advantageously equipped with means for connecting support tube and supported pipe; which comprise:

an approximately flat, advantageously parallelepipedal, base placed between the support tube and the supported pipe; the base being pierced with at least two holes;

first adjustable-tightness means of joining together one of the tubes (support tube, supported pipe) and the base; the first joining means partially surrounding at least a portion of the tube and interacting with the holes;

second means of joining together the other of the tubes (support tube, supported pipe) and the base; the second joining means partially surrounding at least a portion of the other tube and interacting with the holes and with the said first joining means.

It will be understood that, by using the same holes in the base for mounting the first joining means and the second joining means, each of these partially surrounding at least a portion of one of the tubes, there is good attachment and good cohesion of the recommended connection device, which thus has enough inertia to withstand earthquakes.

Furthermore, the use of tubular supports (metal tubes of a portal frame or stiffeners) reinforces the symmetry of the connection between the support and the pipe and allows the pipe to be inclined at any angle about its support.

According to a preferred embodiment, the first joining means comprise at least one yoke comprising a flat U-shaped hoop partially surrounding one of the tubes and the ends of which are in contact with or close to the base, and a clamping hoop gripping the flat hoop over its entire external periphery, each end of the clamping hoop passing through the said base through one of the holes and having means for tightening the said clamping hoop with respect to the flat hoop and the second joining means comprise at least one flat collar, each of the ends of which is attached to the base at one of the holes by means of the corresponding end of the clamping hoop.

Furthermore, provision is made that each of the ends of the flat collar should preferably form a connecting tab which comprises an opening intended to be placed facing a hole in the base.

According to a preferred embodiment, the means of tightening the clamping hoop of the first joining means comprise screw threads intended to pass through the base through holes and to interact with tightening nuts.

According to an advantageous alternative form:
  the flat collar of the second joining means is in the shape of an Ω (it has a central part in the shape of a U to the ends of which joining lugs, preferably rectangular and flat, are connected, preferably at approximately 90°);
  the base has four holes passing right through it in a direction parallel to the Z axis; the X, Y, Z axes which are orthogonal to each other in pairs, denoting, respectively:
    the axis of the support tube;
    the axis of the supported pipe;
    an axis orthogonal to the said axes of the support tube and of the supported pipe;
  the connecting device has two yokes and two flat collars.

In the context of this advantageous alternative form, the holes, in the base, yokes and collars are preferably arranged symmetrically; the planes (X,Z) and (Y,Z) then forming planes of symmetry of the device.

It will be understood that this preferred embodiment leads to a symmetric structure allowing the assembly to be better anchored, that there is then the possibility of having or not having the various elements clamped at the time of assembly and the possibility of varying the inclination of the connecting device to suit the slope of the pipe and/or of the support.

As a preference, the connecting device is used to support pipes on a horizontal support, but it will be understood that the connecting device according to the invention also allows other configurations such as the connection of a horizontal or slightly inclined (the angle of inclination being, for example, 2°) pipe to a support tube arranged vertically or alternatively connection between a pipe and a support tube which form between them a plane oriented in any direction, provided that the pipe and the support tube make an angle of approximately 90° between them.

The recommended connection device may be produced in various alternative ways so that it will either allow a relative movement of translation between the supported pipe and the support tube (longitudinal guidance, transverse guidance, or both at once) or will fully lock the supported pipe and support tube together. For that, in the context of the preferred embodiment of the connecting device specified hereinabove, the dimensions of the flat hoop in particular are modified, wherein these dimensions govern whether or not the yoke is clamped around the tube (support or supported pipe). A flat hoop with dimensions that exceed the diameter of the tube surrounded creates slack and allows the tube surrounded by the yoke comprising this flat hoop to be free to move. If a possibility of movement between the flat collar and the tube it surrounds is desired, then an additional piece or spacer piece which moves the end of the flat collar away from the base and creates slack between the base and the tube surrounded by this flat collar, is provided. It is also possible to surround the support tube with the yoke and the supported pipe with the flat collar or, conversely, to surround the support tube with the flat collar and the supported pipe with the yoke.

Four alternative embodiments of the recommended device for connecting together a supported pipe and a tubular element of the support system of the invention are specified below:

1st alternative

In this:

the yokes surround the supported pipe and the flat hoops of the yokes are dimensioned so that when their ends are in contact with the base, the said supported pipe can slide in the said yokes; and the collars, surrounding the support tube, are shaped in such a way that when their joining lugs are pressed against the base by the tightening nuts mounted on the threaded ends of the clamping hoops, the support tube is locked in place.

This alternative allows one degree of freedom, that of the supported pipe in longitudinal translation with respect to its axis.

2nd alternative

In this:

the yokes surround the support tube and the flat hoops of the yokes are dimensioned in such a way that when their ends are in contact with the base, the support tube can slide in the said yokes; and the collars surrounding the supported pipe are shaped in such a way that when their joining lugs are pressed against the base by the tightening nuts mounted on the threaded ends of the clamping hoops, the supported pipe is locked in place.

This alternative allows one degree of freedom, that of the supported pipe, in transverse translation with respect to its axis.

3rd alternative

In this:

the yokes surround the supported pipe and there is also a drilled spacer piece inserted between each joining lug of the flat collars (surrounding the support tube) and the base and through which the threaded ends of the clamping hoops pass so that when the support tube is pressed against the end of the flat collar there is some slack between the said support tube and the base, allowing the connecting device to slide along the support tube; and the flat hoops of the yokes are dimensioned in such a way that when their ends are in contact with the base, the supported pipe can slide in the yokes.

This alternative (illustrated in appended FIGS. 5A and 5B) allows two degrees of freedom, of the supported pipe, in translation.

4th alternative

In this:

the yokes surround the supported pipe and the flat hoops of the yokes are dimensioned in such a way that when their ends are close to or in contact with the base, the pipe is locked in place by the yokes; and the collars surrounding the support tube are shaped in such a way that when their joining lugs are pressed against the base by the tightening nuts mounted on the threaded ends of the clamping hoops, the support tube is locked in place.

This alternative allows the supported pipe no degree of freedom. This pipe is perfectly locked in place on the support tube.

The invention is now described with no implied limitation, with reference to the appended figures, in which:

BRIEF DESCRIPTION OF THE DRAWINGS

FIGS. 4'A and 4'B are views similar to those of FIGS. 4A and 4B in the case where the tube surrounded has a diameter D0 (outside diameter) which is far smaller than D1;

Figure 1:
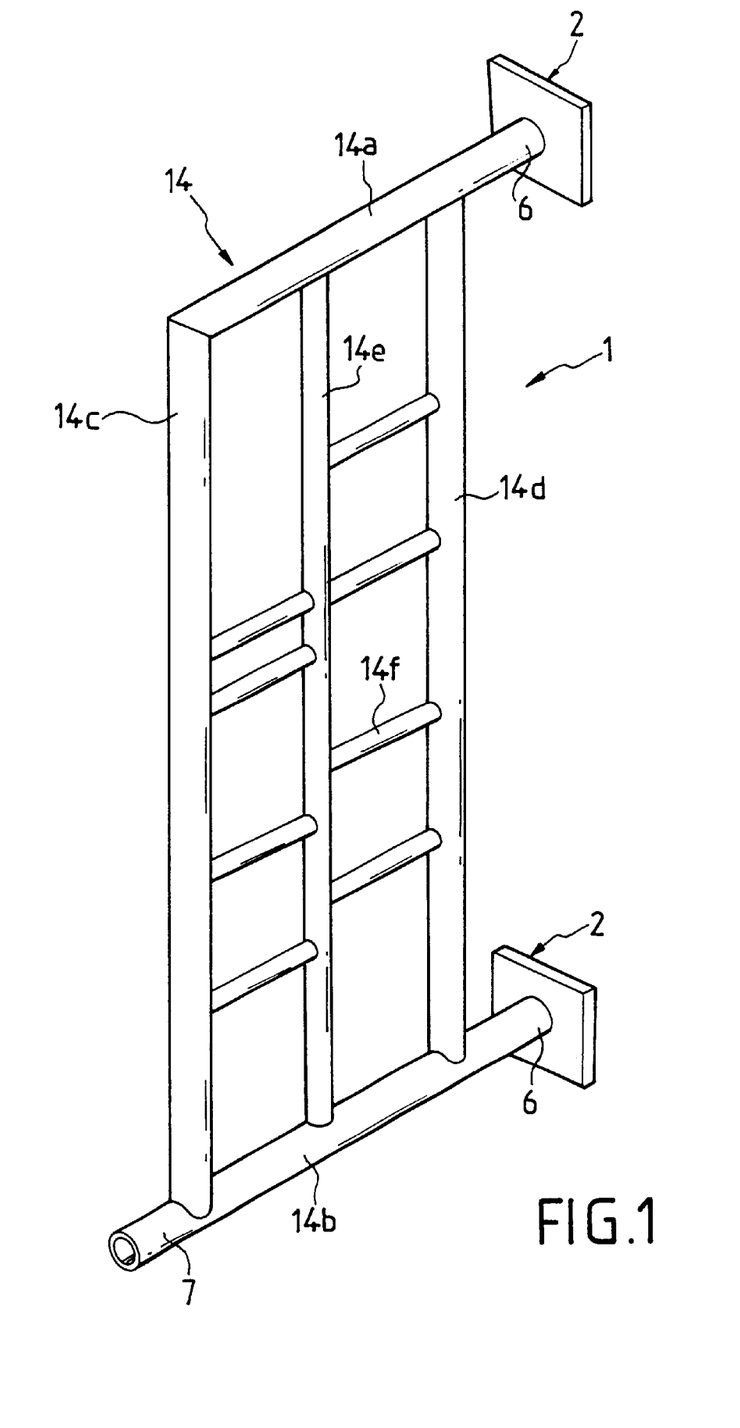
FIG. 1 is a view in perspective of a single-portal support system of the invention.

The support system of the invention, depicted in FIG. 1, comprises a single portal frame 1 consisting of metal tubes 14 welded together. The main framework of the portal frame 1 consists of:

two horizontal tubes 14a and 14b equipped at their free end 6 with mounting plates 2 for anchorage into the structural works. The lower horizontal tube 14b is extended at 7 to allow a floor structure to be fitted;

two vertical tubes 14c and 14d.

Another vertical tube 14e is used so that the rungs 14f are divided into two series.

Figure 2:
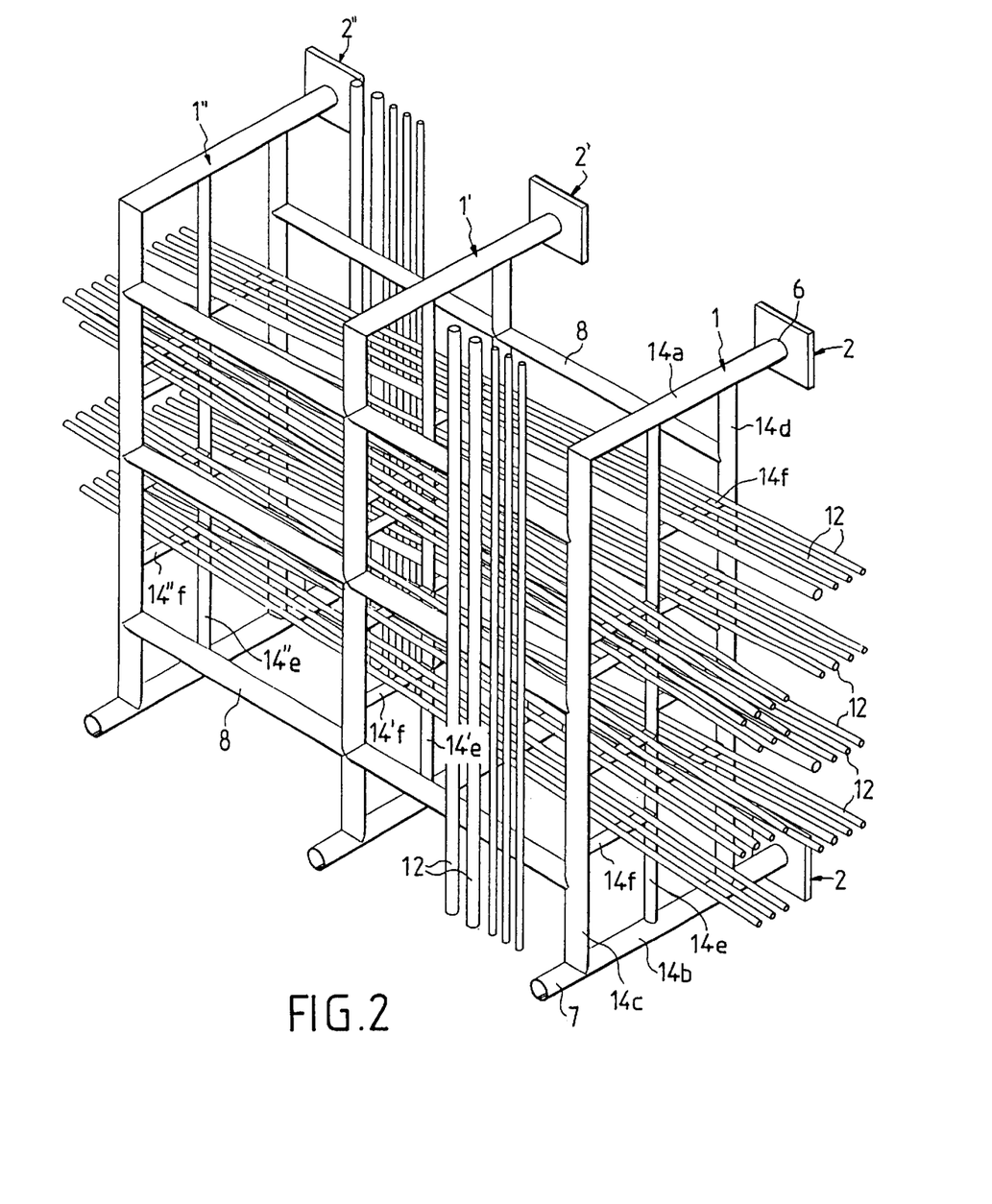
FIG. 2 is a view in perspective of a three-portal support system of the invention, pre-equipped with rows of pipes.

The support system of the invention, depicted in FIG. 2, comprises three portal frames 1, 1', 1" of the type depicted in FIG. 1. Three portal frames 1, 1', 1" are secured together by horizontal stiffeners 8 (tubes). Horizontal, inclined and vertical rows of pipes 12, arranged within the support system of the invention are shown in FIG. 2.

A connecting device 10, which is recommended within the context of this invention, for securing a pipe 12 to a support tube 14 (element of a support system of the invention) is now described with reference to FIG. 3.

Figure 3:
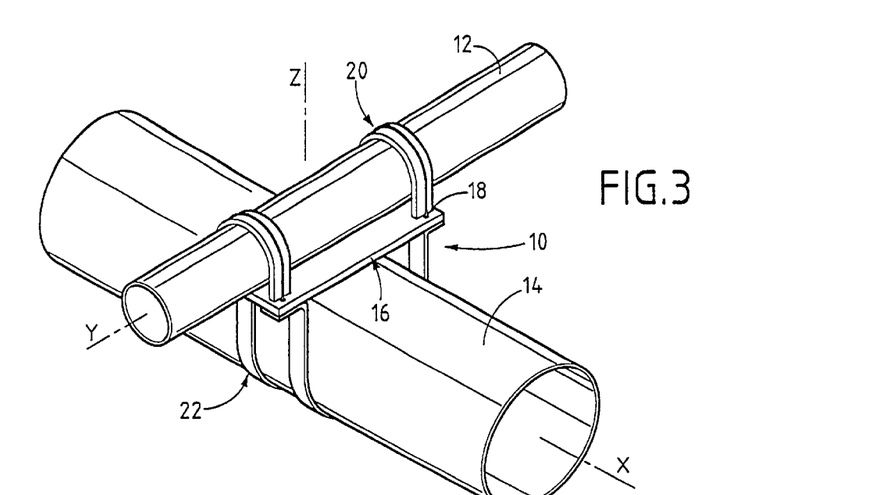
FIG. 3 is a diagrammatic view in perspective of a device recommended in the context of the invention, for connecting support tube (of the support system) and supported pipe.

In FIG. 3, the two tubes 12 and 14 are placed horizontally but it will be fully understood that the two axes X and Y may have any other orientation without the connecting device 10 needing to be modified in any way.

According to the preferred embodiment depicted in FIG. 3, connecting device 10 comprises a right-angled parallelepipedal base 16 pierced with four holes 18; this base 16 has its length and width parallel to the X and Y axes, respectively, of the tubes and is placed between the supported pipe 12 and the support tube 14. The connecting device 10 also comprises two yokes 20, each surrounding a portion of the pipe 12 and two flat collars 22 (in the shape of an Ω) each surrounding a portion of the support tube 14, wherein the ends of the yokes 20 and of the flat collars 22 are joined together and to the base 16 by means of the holes 18 as is described in greater detail later.

Figure 4:
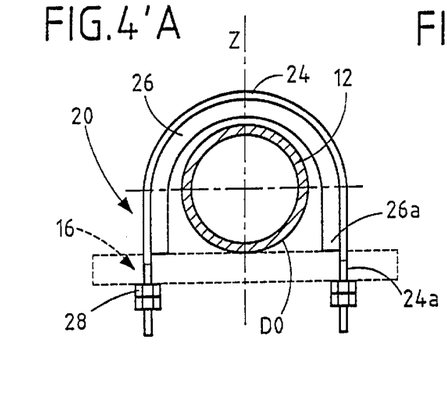
FIGS. 4A and 4B depict, respectively viewed from the front and from the side, the first joining means (the yoke) of the said connecting device of FIG. 3 surrounding a tube of diameter D1 (outside diameter)
Figure 4A:
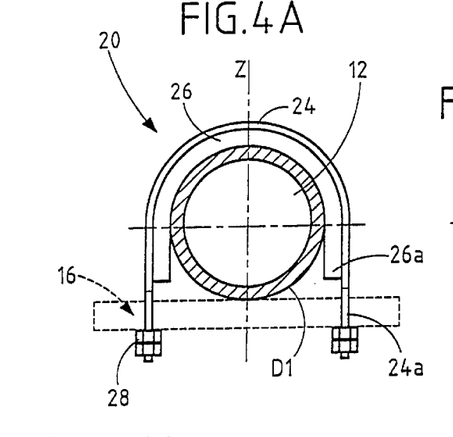
Figure 4B:
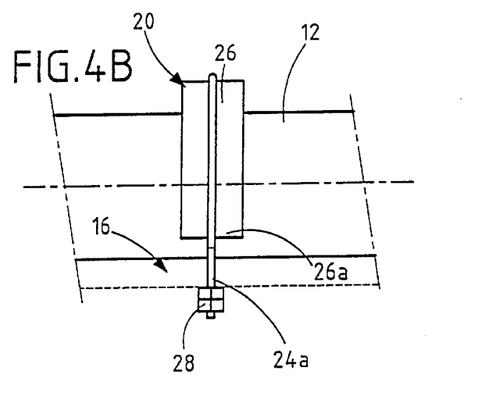

Reference is now made to FIGS. 4A and 4B which illustrate a yoke 20 in greater detail. Each yoke 20 is made up, of a clamping hoop 24 of circular section constituting a U-bolt intended to surround a portion of one of the tubes and straight and threaded ends 24a which are intended to pass through two holes 18 in the base 16 intended and to interact with tightening nuts 28, Each yoke 20 is also made up of a flat hoop 26 constituting a lining placed between the tube and the clamping hoop 24.

As can be seen more specifically in FIGS. 4A and 4'A, there may or may not be a certain amount of slack between the tube and the flat hoop 26, depending on the diameter of the tube surrounded by the yoke 20 and on the size of the flat hoop 26.

In the case of FIGS. 4A and 4B, the tube 12 has a large diameter D1 equal to the separation between the straight branches of the U of the flat hoop 26. The diameter D1 exceeds the distance between the ends 26a of the flat hoop is 26 and the bottom of the U. A portion of the external surface of the tube 12, the cross-section of which constitutes the upper semi-circle of the tube 12, is in contact with the inside of the flat hoop 26, in the upper part of the flat hoop 26 forming the rounded base of the U. The lower part of the tube 12 is in contact with the base 16, depicted in dotted lines in FIG. 4A, along a portion of the generatrix of the tube 12. In this instance, the tube 12 is locked in place by the yoke 20 which is attached by mounting tightening nuts 28 on the threaded ends 24a of the clamping hoop, wherein the nuts 24 are tightened in order to lock the tube 12 between the base 16 and the yoke 20; the straight branches of the U of the flat hoop 26 have such a length that their ends 26a are not in contact with the base 16.

In the second instance depicted in FIGS. 4'A and 4'B, the diameter D0 of the tube 12 is (smaller than D1) smaller than the distance between the ends 26a of the flat hoop 26 and the bottom of the U. When fitting the yoke 20 and tightening the nuts 28 onto the threaded ends 24a of the clamping hoop 24, there is a limiting position that corresponds to the instant when the ends 26a of the flat hoop 26 come into contact with the base 16 so that the nuts 28 are locked and the tube 12 is not clamped tightly in the yoke 20 because there is some slack between the tube 12 (of outside diameter D0) and the flat hoop 26. In the case illustrated in FIGS. 4'A and 4'B, there is slack both between the tube 12 and the straight branches of the flat hoop 26, and between the tube 12 and the assembly that consists of the base 16 and the rounded bottom of the U of the flat hoop 26.

It will be understood from the foregoing explanations that the clamping of the yoke 20 onto the tube it surrounds is governed by the dimensions of the flat hoop 26, that is, the diameter of the rounded base of the U, on one hand, and by the length of the branches of the U on the other hand, as a function of the diameter of the tube, so that the flat hoop 26 either does or does not transmit to the tube in question the tightening of the clamping hoop 24 placed around the tube. Furthermore, the flat hoop 26 constitutes a lining that protects the tube because it prevents the external surface of the tube which is in contact with the yoke 20 from becoming deformed by spreading the compressive load generated by the clamping hoop 24 over a portion of the periphery of a portion of tube corresponding to the width of the flat hoop 26.

For comparative purposes, FIGS. 4A and 4'A depict two possible diameters (D1 and D0 respectively, with D1>D0) for the tube 12, supported pipe or support tube. It is quite obvious that, in practice, the dimensions of the first joining means are adapted to suit those of the tube 12 used rather than vice versa.

The (outside) diameter of the tube 12 is in fact dictated by various constraints, particularly the flow rate of fluid travelling through the tube (12)(in the case of a supported pipe) and by the wall thickness of the tube (12) and/or by the strength of the structure (case of a supported pipe and of asupport tube). As the diameter is fixed, the dimensions of the first joining means—particularly those of the flat hoop 26—are adapted to suit the diameter, depending on the degrees of freedom desired. In order to generate slack between the flat hoop and the tube it surrounds, or even to distribute such slack asymmetrically with respect to the two axes of the tube, there are two parameters that can be used:

the inside diameter (of the circular part) of the flat hoop;

the length of the straight branches of the said flat hoop.

Thus, by selecting yoke 20 which has flat hoop 26 of appropriate length and diameter, it is possible to envisage clamping the tube tightly in the yoke 20 so that this tube has no degree of freedom, or alternatively it is possible to provide larger flat hoop 26 which allows a certain amount of slack between the tube and the yoke 20 so that this tube can slide in the yoke, this giving it a degree of freedom in translation along its own axis.

The connecting device 10 proposed comprises, as a preference (as shown in the appended figures) two yokes 20 and two flat collars 22 arranged in such a way as to form an assembly that is symmetric with respect to the planes (X,Z) and (Y,Z), the axes (X,Y,Z) being mutually orthogonal. In this configuration, the mid-planes of each pair of collars 22 or of yokes 20 are offset from one another by a distance that exceeds the diameter of the tube that this pair does not surround.

Figures 5A, 5B, 6:
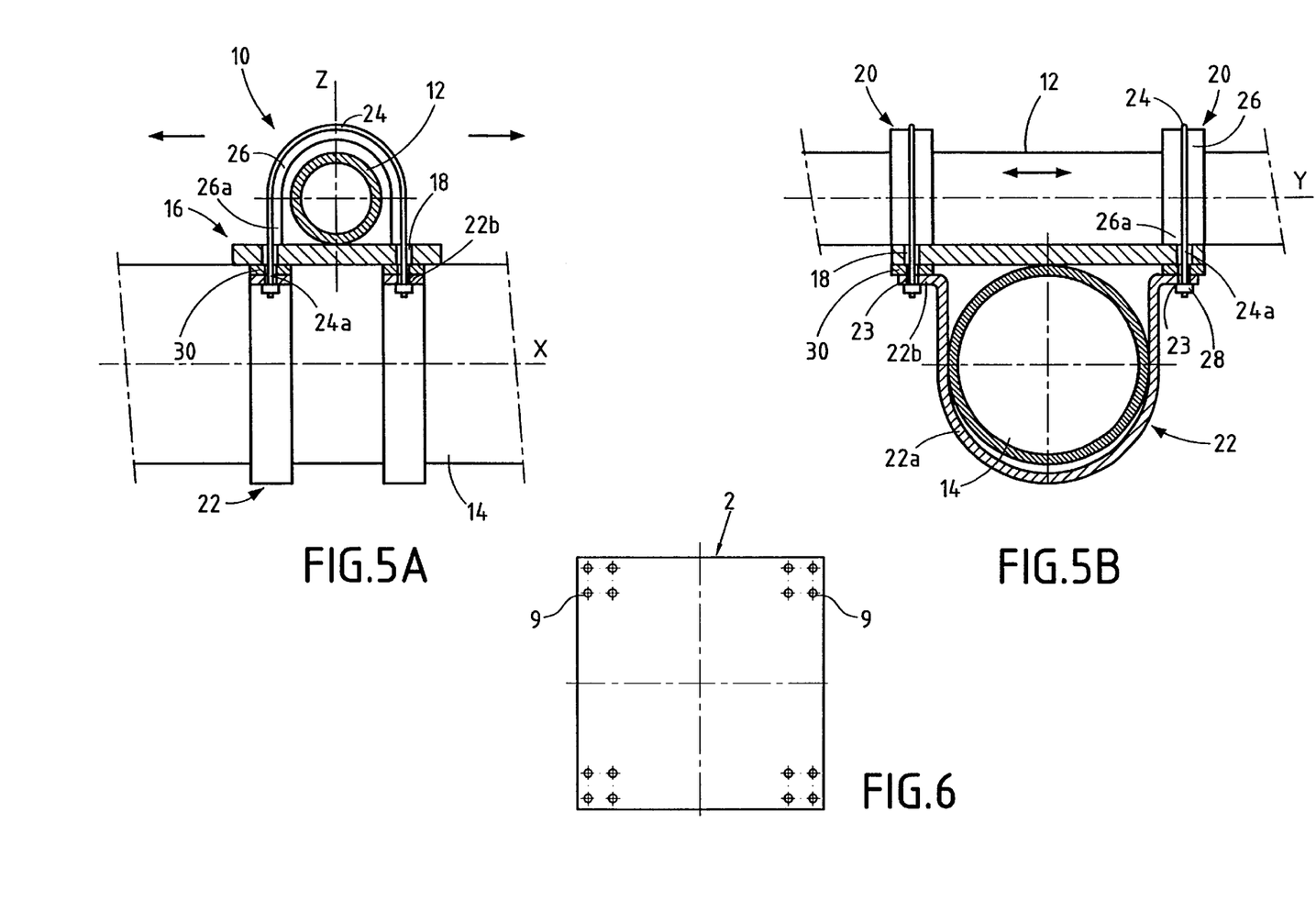
FIGS. 5A and 5B depict, respectively, viewed from the front and from the side, a particular embodiment of a device recommended in the context of the invention for connecting support tube (of the support system) and supported pipe.
FIG. 6 is a view from the front of a mounting plate for anchoring a support system of the invention into the structural works.

Reference is now made to FIGS. 5A and 5B which illustrate an alternative embodiment of the connecting device 10 shown in FIG. 3. The aim here is to give the supported pipe 12 two degrees of freedom corresponding to two translational movements in directions parallel to the X and Y axes, respectively. This alternative embodiment is obtained with the aid of a drilled spacer piece 30 inserted between the joining lugs 22b of each (Ω-shaped) collar 22 and the base 16; the drilling in this spacer piece 30 is positioned to lie, on assembly, facing and in line with the opening 23 in a joining lug 22b and a hole 18 in the base 16. Four drilled spacer pieces 30 are thus needed in the particular instance illustrated in FIGS. 5A and 5B, but other alternative embodiments, such as the use of two long thin spacer pieces comprising two drillings corresponding to the ends of the two flat collars 22 that lie on the same side of the tube 14 may be envisaged (this particular alternative form would alter FIG. 5A by connecting the two spacer pieces 30 that can be seen, which would then only form a single spacer piece, FIG. 5B then remaining unchanged).

The laid pipes are thus supported freely. This is because these spacer pieces 30 generate slack between the support tube 14 (FIG. 5B) and the assembly made up of base 16 and flat collars 22, which slack is equal to the thickness of the spacer pieces 30.

For the record, it is emphasized that other structural configurations may be envisaged for the recommended device for connecting together a supported pipe and a tubular element of the support system of the invention. Thus:—other means of attaching together the yokes 20, the base 16 and the collars 22 may be envisaged instead of the interaction of holes, threaded rods and nuts; in particular, complementary shapes which nest together by clipping or elastic deformation may be provided;

the flat collars 22 may have shapes other than the one described earlier, that is to say the Ω shape. Thus, by using, for example, a base of parallelepipedal overall shape, the four corners of which have projections through which there are holes in a direction that is in the (X,Y) plane, this will allow the use of flat collars which are U-shaped rather than Ω-shaped.

Finally, reference is made to FIG. 6 which shows an anchoring plate 2 which can be fitted to the support system of the invention. Such mounting plates 2 allow the portal frames 1 to be installed at theoretical reference points defined during the support studies, while preserving the integrity of the reinforcements in the structural works of the shell walls, floors and/or ceilings into which the portal frame is anchored. The mounting plate 2 comprises four series of positioning marks 9, which are off-centred. The marks were made at the workshop. The distance between the centres of the marks 9 of each of the series have been calculated for the fitting of standard studs, while at the same time avoiding a reinforcing bar, wherein the reinforcing-bar diameter and reinforcing-bar spacing parameters have been taken into account. The drillings are to be performed in situ, depending on the position of the reinforcement, through one of the positioning marks of each of the four series or, failing this, at the centre of each of the series. By using such plates, excellent stability of the anchorage is obtained, especially when use is made of four anchoring points arranged symmetrically and offset.

What is claimed is:

1. A support system for supporting pipes comprising:
at least one pre-assembled, installable portal frame including metal tubes with circular cross-section welded together and set out as a main framework and rungs for supporting pipes having a horizontal or inclined longitudinal axis; and
an anchoring structure secured to the main framework of said portal frame, said anchoring structure being constructed and arranged to anchor said pre-assembled, installable portal frame to structural works in a service gallery and to spread a load of said portal frame and said pipes over a concrete structure of said structural works,
said anchoring structure comprising mounting plates comprising at least one series of positioning marks, a distance between centers of said positioning marks of said series allowing at least one stud to be fitted through one of said positioning marks of said series or at the center of said series, each of said series of positioning marks comprising four positioning marks arranged at four corners of a square having its side longer than a diameter of a reinforcing bar included in the structural works and shorter than a distance between two of said reinforcing bars.

2. The support system according to claim 1, wherein said mounting plates comprise at least two series of said positioning marks; said at least two series being distributed symmetrically at the surface of said mounting plates.

3. The support system according to claim 1, wherein said main framework includes two horizontal tubular sections and at least one vertical tubular section; said rungs being arranged horizontally in one series, secured to said at least one vertical tubular section of said main framework.

4. The support system according to claim 3, wherein said two horizontal tubular sections of said main framework each having a free end to which said anchoring structure is attached.

5. The support system according to claim 1 comprising at least two said portal frames secured together by horizontal stiffeners.

6. The support system according to claim 5, wherein said at least two portal frames, secured together with said horizontal stiffeners, are arranged to be pre-equipped with said pipes prior to placement in said service gallery, said pipes being distributed in one of the following: a horizontal row, and/or a vertical row, and an inclined row.

7. The support system according to claim 1, wherein said main framework includes two horizontal tubular sections and at least two vertical tubular sections, said rungs being arranged horizontally in two adjacent series secured to said vertical tubular sections of said main framework and to at least one another, intermediate, vertical tubular section secured to said main framework.

8. The support system according to claim 1, wherein said main framework includes two horizontal tubular sections and several vertical tubular section, said rungs being arranged horizontally in more than two adjacent series, secured to said vertical tubular sections of said main framework.

9. A support system for supporting pipes comprising:
at least one pre-assembled, installable portal frame including metal tubes with circular cross-section welded together and set out as a main framework and rungs for supporting pipes having a horizontal or inclined longitudinal axis, said portal frame further including a bottom tubular part designed for a floor structure including a metal grating; and
an anchoring structure constructed and arranged to anchor said pre-assembled, installable portal frame to structural works in a service gallery.

10. The support system according to claim 9, wherein said main framework includes two horizontal tubular sections and at least one vertical tubular section, said rungs being arranged horizontally in one series, and secured to said at least one vertical tubular section of said main framework.

11. The support system according to claim 10, wherein said two horizontal tubular sections of said main framework each have a free end to which said anchoring structure is attached.

12. The support system according to claim 9 comprising at least two said portal frames secured together by horizontal stiffeners.

13. The support system according to claim 12, wherein said at least two portal frames, secured together with said horizontal stiffeners, are arranged to be pre-equipped with said pipes prior to placement in said service gallery, said pipes being distributed in a selected one of the following: a horizontal row, a vertical row, and an inclined row.

14. The support system according to claim 9, wherein said main framework includes two horizontal tubular sections and at least two vertical tubular sections, said rungs being arranged horizontally in two adjacent series secured to said vertical tubular sections of said main framework and to at least one another, intermediate, vertical tubular section secured to said main framework.

15. The support system according to claim 9, wherein said main framework includes two horizontal tubular sections and several vertical tubular section, said rungs being arranged horizontally in more than two adjacent series, and being secured to said vertical tubular sections of said main framework.

16. A support system for supporting pipes comprising:
at least one pre-assembled, installable portal frame including metal tubes with circular cross-section welded together and set out as a main framework and rungs for supporting pipes having a horizontal or inclined longitudinal axis;
an anchoring structure constructed and arranged to anchor said pre-assembled, installable portal frame to structural works in a service gallery; and
a connecting structure constructed and arranged to connect said tube of said portal frame to said pipe, said connecting structure comprising:
an approximately flat base placed between said tube and said pipe, said base being pierced with at least two holes; and first adjustable-tightness means and a second means of joining said tube and said pipe to said base and interacting with said holes.

17. The support system according to claim 16, wherein said main framework includes two horizontal tubular sections and at least one vertical tubular section, said rungs being arranged horizontally in one series, and secured to said at least one vertical tubular section of said main framework.

18. The support system according to claim 17, wherein said two horizontal tubular sections of said main framework each have a free end to which said anchoring structure is attached.

19. The support system according to claim 16, comprising at least two portal frames secured together by horizontal stiffeners.

20. The support system according to claim 19, wherein said at least two portal frames, secured together with said horizontal stiffeners, are arranged to be pre-equipped with said pipes prior to placement in said service gallery, said pipes being distributed in a selected one of the following: a horizontal row, a vertical row, and an inclined row.

21. The support system according to claim 16, wherein said main framework includes two horizontal tubular sections and at least two vertical tubular sections, said rungs being arranged horizontally in two adjacent series secured to said vertical tubular sections of said main framework and to at least one another, intermediate, vertical tubular section secured to said main framework.

22. The support system according to claim 16, wherein said main framework includes two horizontal tubular sections and several vertical tubular section, said rungs being arranged horizontally in more than two adjacent series, and being secured to said vertical tubular sections of said main framework.

23. A support system for supporting pipes comprising:
at least one pre-assembled, installable portal frame including metal tubes with circular cross-section welded together and set out as a main framework and rungs for supporting pipes having a horizontal or inclined longitudinal axis;
an anchoring structure constructed and arranged to anchor said pre-assembled, installable portal frame to structural works in a service gallery; and
a connecting structure constructed and arranged to connect said tube and said pipe, said connecting structure comprising:
at least one yoke comprising a flat U-shaped hoop partially surrounding one of said pipes and having ends located in proximity to an approximately flat base having holes, and a clamping hoop for gripping said flat hoop over its entire external periphery, said clamping hoop passing through said base through one of the holes and having means for tightening said clamping hoop with respect to said flat hoop; and
at least one flat collar having its ends attached to the base at one of said holes by means of the corresponding end of said clamping hoop.

24. The support system according to claim 23, wherein said main framework includes two horizontal tubular sections and at least one vertical tubular section, said rungs being arranged horizontally in one series, and secured to said at least one vertical tubular section of said main framework.

25. The support system according to claim 24, wherein said two horizontal tubular sections of said main framework each have a free end to which said anchoring structure is attached.

26. The support system according to claim 23 comprising at least two said portal frames secured together by horizontal stiffeners.

27. The support system according to claim 26, wherein said at least two portal frames, secured together with said horizontal stiffeners, are arranged to be pre-equipped with said pipes prior to placement in said service gallery, said pipes being distributed in a selected one of the following: a horizontal row, a vertical row, and an inclined row.

28. The support system according to claim 23, wherein said main framework includes two horizontal tubular sections and at least two vertical tubular sections, said rungs being arranged horizontally in two adjacent series secured to said vertical tubular sections of said main framework and to at least one another, intermediate, vertical tubular section secured to said main framework.

29. The support system according to claim 23, wherein said main framework includes two horizontal tubular sections and several vertical tubular section, said rungs being arranged horizontally in more than two adjacent series, and being secured to said vertical tubular sections of said main framework.

30. A method of for supporting pipes conducting fluid in service galleries, particularly in the chemical, petrochemical or nuclear industry, comprising:
pre-assembling at least one portal frame including metal tubes welded together and set out as a main framework and rungs intended to support pipes having a horizontal or inclined longitudinal axis;
moving said at least one pre-assembled portal frame to a service gallery;
installing said at least one pre-assembled portal frame in said service gallery;
anchoring said pre-assembled portal frame to structural works in said service gallery; and
connecting said pipe to said tube by a connecting structure including at least one yoke comprising a flat U-shaped hoop partially surrounding said pipe and having ends located in proximity to an approximately flat base having holes, and a clamping hoop for gripping said flat hoop over its entire external periphery, said clamping hoop passing through said base through one of the holes and having means for tightening said clamping hoop, and at least one flat collar having its ends attached to the base at one of said holes by means of the corresponding end of said clamping hoop.

31. The method of claim 30 further comprising, prior to said moving, providing at least two said portal frames secured together by horizontal stiffeners, and arranging said at least two portal frames, secured together with said horizontal stiffeners, with said pipes.

32. The method of claim 30 wherein said pre-assembling step further comprises the step of installing at least one anchor structure to said portal frame.

33. A support system for supporting pipes for conducting fluid in service galleries, particularly in the chemical, petrochemical or nuclear industry, comprising:
at least one pre-assembled, installable portal frame including metal tubes welded together and set out as a main framework and rungs intended to support said pipes having a horizontal or inclined longitudinal axis; and
an anchoring structure constructed and arranged to anchor said pre-assembled, installable portal frame to structural works in a service gallery;
wherein said anchoring structure is constructed to spread a load of said portal frame and said pipes over a concrete structure of said structural works;
wherein said anchoring structure is secured to the main framework of said portal frame and is appropriate for anchoring by fixing studs, and comprises mounting plates comprising at least one series of positioning marks;

wherein distances between centers of said positioning marks of said series having been calculated to allow at least one said stud to be fitted through one of said positioning marks of said series or at the center of said series;

wherein each of said series comprises four positioning marks arranged at four corners of a square having its side longer than a diameter of a reinforcing bar included in the structural works and shorter than a distance between two of said reinforcing bars.

34. The support system according to claim 33, wherein said mounting plates comprise at least two series of said positioning marks; said at least two series being distributed symmetrically at the surface of said mounting plates.

35. The support system according to claim 33, wherein said main framework includes two horizontal tubular sections and at least one vertical tubular section, said rungs being arranged horizontally in one series, and secured to said at least one vertical tubular section of said main framework.

36. The support system according to claim 35, wherein said two horizontal tubular sections of said main framework each have a free end to which said anchoring structure is attached.

37. The support system according to claim 33 comprising at least two said portal frames secured together by horizontal stiffeners.

38. The support system according to claim 37, wherein said at least two portal frames, secured together with said horizontal stiffeners, are arranged to be pre-equipped with said pipes prior to placement in said service gallery, said pipes being distributed in a selected one of the following: a horizontal row, a vertical row, and an inclined row.

39. The support system according to claim 33, wherein said main framework includes two horizontal tubular sections and at least two vertical tubular sections, said rungs being arranged horizontally in two adjacent series secured to said vertical tubular sections of said main framework and to at least one another, intermediate, vertical tubular section secured to said main framework.

40. The support system according to claim 33, wherein said main framework includes two horizontal tubular sections and several vertical tubular section, said rungs being arranged horizontally in more than two adjacent series, and being secured to said vertical tubular sections of said main framework.

* * * * *